Patented Feb. 13, 1945

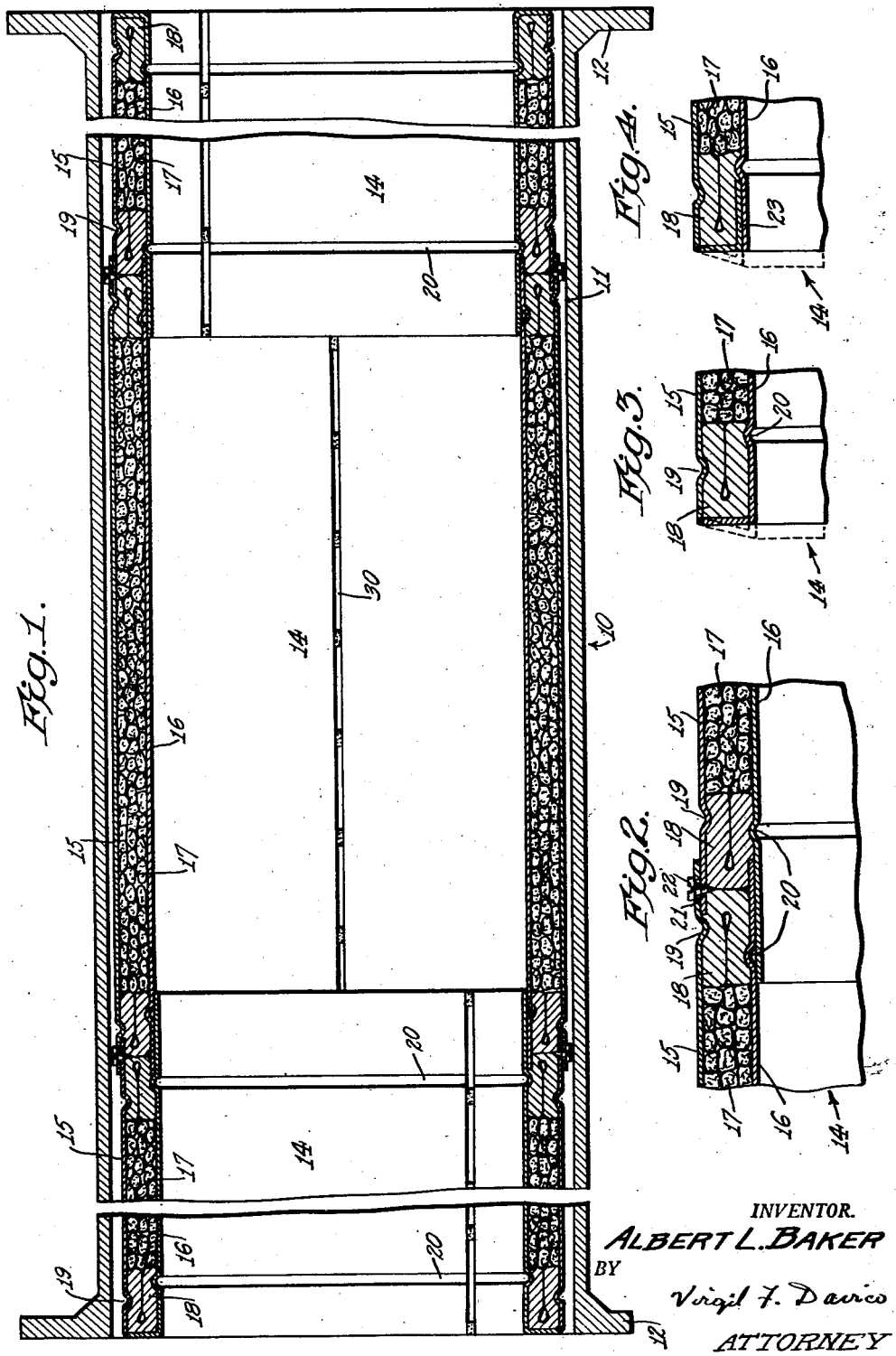

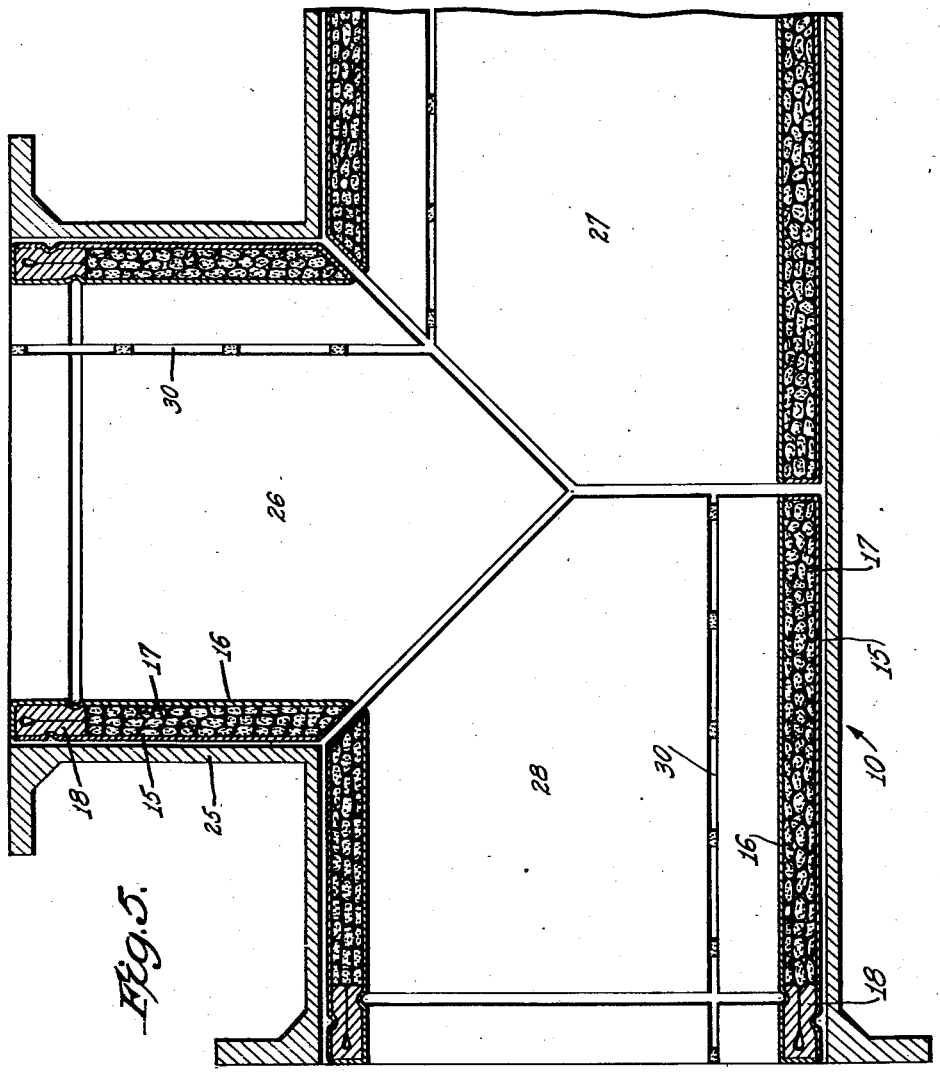

2,369,204

UNITED STATES PATENT OFFICE 2,369,204

INSULATION LINING FOR CONDUITS

Albert L. Baker, Summit, N. J., assignor to The M. W. Kellogg Company, New York, N. Y., a corporation of Delaware Original application May 3, 1940, Serial No. 333,093. Divided and this application April 29, 1942, Serial No. 440,922

4 Claims. (Cl. 138—64)

REISSUED

This invention relates in general to conduits, vessels and the like, through which fluids are conducted or in which fluids are processed and in particular to novel apparatus for controlling the transfer of heat from the fluid within the conduit or vessel to the atmosphere or other external medium. This application is a division of application Serial No. 333,093, filed May 3, 1940.

It is now quite usual in many arts, such as the power plant, chemical, petroleum refining, and similar arts, to provide conduits and vessels for handling materials in the gas, or vapor, phase at extremely high temperatures and generally also under the extreme pressures. Temperatures of 1000° F., and more, and pressures of 1000 lbs. per square inch, and more, are not uncommon. The materials handled, furthermore, are often of a corrosive nature.

The fabricators of the conduits and vessels for this class of service have found that carbon steel, primarily because of its low creep-strength and inferior corrosion resistance at the operating temperatures, is not the best material for the purpose and have turned to alloys of superior high temperature creep-strength and corrosion resistance. These alloys aside from the special properties, just mentioned, are generally not as desirable as carbon steel as they are much more expensive, are more difficult to fabricate, require expensive heat treatment to bring out their special properties and are more difficult to maintain and repair.

Because of the extreme service temperatures it is usual to insulate conduits and vessels of this type by covering their outside surfaces with suitable insulating materials. The cost of insulating in this manner is relatively high.

I have found, when handling materials that are made up of condensable constituents in the gas, or vapor phase, or include both condensable and non-condensable constituents in the gas, or vapor, phase, that by the proper control of the transfer of heat from the high temperature material within the conduit, or vessel, to the metal walls, the metal of the walls can easily be kept within the temperatures range wherein carbon steel has satisfactory characteristics such as creep-strength so that by employing this mode of heat transfer control the special properties of the costly alloys are not required and the conduits and vessels can safely be made of carbon steel. I have also found that, with the materials above mentioned, by the proper control of the heat transfer the heat losses are substantially reduced and minimized. I have further found that the arrangements employed for effecting the heat transfer control, when used in conduits or vessels handling either condensable or non-condensable materials, also result in a substantial reduction of the heat losses.

It is a primary object of this invention to provide a novel insulation liner adapted to line the inside surface of the walls of conduits, or vessels, which is of cheap and simple construction, may be easily and cheaply applied and makes full use of the insulation value of the insulating material employed.

It is also a primary object of the invention to provide a novel insulation liner adapted to be positioned against the inside surfaces of the walls of conduits, or vessels, which includes an inner metal wall, that may be of non-corrosive metal, in contact with the bulk of the materials handled in the conduit, or vessel, the metal wall being such that it allows pressure equalization across the full cross-section of the conduit, or vessel, including the portion thereof occupied by the lining, and relative movement between the components of the lining so that in operation the lining components are under no stress due either to thermal expansion or pressure; the lining, furthermore, being such that the temperature of the metal of the conduit, or vessel, walls is reduced materially below that of the material handled whereby when media at high temperature are handled the expansion and thermal stresses in the conduit, or vessel, walls are materially reduced and the vessels, or conduits, may be safely fabricated from ordinary materials and designed for operation within well known limits of temperature and pressure.

It is also an important object of this invention to provide a novel insulation liner adapted to be positioned against the inside surfaces of the walls of conduits, or vessels, which is made up of a plurality of connected sections, each of the sections, however, being capable of limited independent movement, each section including an inner and an outer jacket between which is positioned the insulating material, each of the jackets having at their ends corrugations, or equivalent stiffening elements, which serve to stiffen the jackets, act as stops for limiting the movement of the sections and serve to hold the insulating material in position; the jackets being provided with passageways therein for pressure equalization.

The further objects and advantages of the invention will be readily appreciated from a consideration of the following detailed description of the invention taken with the accompanying drawings, in which, Fig. 1 is a longitudinal section of a pipe having applied thereto the lining of the invention, Fig. 2 is a fragmentary sectional view showing the manner in which adjacent sections of the lining are joined, Figs. 3 and 4 are fragmentary sectional views showing alternative ways of closing the flange ends of the lining sections, and Fig. 5 is a longitudinal sectional view of a lined portion of a pipe that includes a connector.

The novel apparatus of the invention is of general application and may be applied to vessels of any sort that are used for any purpose. Thus, the novel apparatus may be used in handling liquids, solids, gases, or vapors, or mixtures thereof. When the material handled is in the gas, or vapor, phase it may be all condensable, or it may be all non-condensable, or it may include both condensable and non-condensable constituents.

While the invention is applicable to vessels and conduits in general, it will be disclosed in connection with a pipe.

Thus, in Fig. 1 is shown a pipe 10 that includes a wall 11 with flanges 12 at its ends. Pipe 10 may be of any suitable material but usually carbon steel will be satisfactory. When the materials handled are sufficiently corrosive the inside surface of pipe 10 may be defined by a suitable corrosion resistant material such as chrome steel alloy, pure nickel etc.

Within pipe 10 is an insulating liner 14. Liner 14 is made up of a plurality of sections each of which includes a pair of metal jackets 15 and 16 separated by packed fibrous insulating material 17 and 18. Jackets 15 and 16 may be made of any preferred metal suited for the intended service thus, both jackets may be of carbon steel or both of alloy steel of special property. In high temperature service it is at present preferred to make outer jacket 15 of light gage carbon steel and inner jacket 16 of a light gage corrosion resistant alloy such as 14% chrome steel. The thickness of jackets 15 and 16 has been exaggerated in Figs. 1 and 5 so that the construction may be more clearly shown.

Jackets 15 and 16 are formed from sheets that are bent to tube form. The abutting edges of the bent sheets form seams 30, shown in Figs. 1 and 5, which are open to the extent required for maintaining the pressure through the cross-section of pipe 10 substantially equal. The abutting edges of the bent sheets may be held together at spaced intervals, as by the tack welds shown. The width of seams 30 has been exaggerated for purposes of illustration. Outer jacket 15 is of such a diameter as to fit easily within pipe 10. Inner jacket 16 is of such a diameter that between it and outer jacket 15 may be packed the insulating material 17 and 18 necessary to secure the desired temperature drop. At present, mineral wool is preferred for insulating material 17 and 18 as this material has the necessary resistance to temperature, is resistant to corrosive media, is of excellent insulating quality and, because of its fibrous character, may be packed to various densities. Of the mineral wools, lead slag wool, is at present preferred.

At the ends of each of the sections of liner 14 is positioned a plug of insulation 18 of long fiber material; material 17 between plugs 18 is preferably in the granular or nodulated form. The long fiber plugs 18 serve to prevent movement of the looser material 17.

As best shown in Figs. 2, 3 and 4 each of the sections of jackets 15 and 16 have rolled corrugations 19 and 20 provided adjacent each of their ends. At each end of the sections of liner 14 corrugations 19 and 20 are so located that their centers are spaced somewhat along the longitudinal axis of the sections. Corrugations 19 and 20 serve as a means for stiffening the sections of the jackets 15 and 16 as well as a means for holding plugs 18 in position; corrugations 20 also serve as expansion distribution stops as will appear hereinafter. Equivalent stiffening elements may be employed in place of corrugations 19 and 20.

The sections of liner 14 are preferably united by the joint shown in Fig. 2. In effecting this joint a plurality of slotted holes 21 are provided, preferably equally spaced, around the encircling one of the outer jacket sections 15 of the joint preferably midway between its corrugation 19 and its end. The encircled one of the outer jacket sections 15 is positioned within the encircling one of the outer jacket sections 15 with its end separated from corrugation 19 of said encircling jacket section by a distance at least equal to one half the length of slotted holes 21. Self-tapping screws 22 are positioned intermediate the ends of slotted holes 21 and driven into said encircled jacket section. By reason of this arrangement the outer jacket sections 15 have a limited independent longitudinal movement, when expanding or contracting, before they are constrained to move as a unit. The encircled one of the inner jacket sections 16 is positioned within the encircling one of inner jacket sections 16 with its corrugation 20 spaced from the end of said encircling jacket section by a distance about equal to the length of slotted holes 21. With this arrangement corrugation 20 of said encircled jacket section and the end of said encircling jacket section act as limit stops for independent movement of their inner jacket sections during expansion of their inner jacket sections 16 and thus prevent warping and other distortion of said inner jacket sections 16.

The sections of liner 14 that terminate at flanges 12 have their ends closed as shown in Figs. 3 or 4. In Fig. 3 the end of inner jacket 16 is bent outwardly to meet the end of outer jacket 15 and united thereto at spaced intervals by tack or spot welds. The end of inner jacket 16 may be bent as shown in the solid lines or it may be bent as shown in the dotted lines, in either case cuts are made, equally spaced around the circumference of the end of inner jacket 16, so that the bending may easily be effected. In Fig. 4, a separate piece 23 is used to close the section end. Piece 23 is formed from a tube of appropriate length by bending one end of its outwardly; again, cuts are provided equally spaced around the end of the tube so that the bending may be easily effected. Piece 23 is spot or tack welded at spaced points to outer jacket 15 and may be shaped either as shown in the solid lines or as shown in the dotted lines.

It is to be particularly noted that the construction of liner 14 is such that by reason of the open joints of the elements of the sections, the porous character of the insulating material and the perforated ends of the sections, the space between outer jacket 15 and the wall of pipe 10 and the space between inner jacket 16 and outer jacket 15 are in free communication with the space within inner jacket 16 and with each other. Hence, the pressure will always be equal throughout the cross-section of the space within the walls of pipe 10. It is also to be particularly noted that except at the very ends of liner 14 jackets 15 and 16 are unconnected by metal so that throughout liner 14 the full insulating value of the insulation 17 and 18 is made use of.

In Fig. 5 is shown the manner in which the sections of liner 14 are formed to line the region of pipe 10 that includes a large connector, such as connecter 25. Liner 14 in this region is made in three sections 26, 27, and 28.

Section 26 is made in the same manner as the end sections of liner 14 above described and its flange end closed as shown in either Fig. 3 or Fig. 4. The end of section 26 within pipe 10 is shaped to the contour of the intersecting cylindrical surfaces. This end of section 26 is closed as shown in Fig. 3 except that the outer jacket 15 is bent to meet the inner jacket 16. In this case, as before, the bent end is provided with spaced cuts before bending. Section 27 is formed in the same way as an intermediate section of liner 14, above described, except for the end below connector 25. This end, above the center of pipe 10 is shaped to the contour of the intersecting cylindrical surfaces so as to closely match the abutting end of section 26. Below the center line of pipe 10 the end of section 27 is formed to be in a plane transverse to longitudinal axis of pipe 10. The shaped end of section 27 is closed by bending outer jacket 15 to inner jacket 16 as stated in connection with section 26. Section 28 is formed in the same way as the end section of lining 14, above described, and its inside end formed to match the ends of sections 26 and 27 in the manner described in connection with these sections. Since relative movement between sections 26, 27 and 28 is not desirable these sections are preferably tied together by tack, or spot welds.

While the lining of a cylindrical body only has been described it should be obvious that bodies of any shape may be lined in accordance with this teaching.

Lining 14 is made to have such an insulating value that it will provide a desired temperature drop between the material within inner jacket 16, i. e., the bulk of the material handled, and the inside surface of the walls of pipe 10. Knowing the operating conditions, the characteristics of the material to be handled, as well as the characteristics of the materials of lining 14 and pipe 10, it is a simple matter to calculate from known formulae the thickness of the insulation material, at a preferred density of pack, required within lining 14 to give the necessary temperature drop.

While lining 14 is permeable to the extent above stated, it is not permeable to the extent that there is any substantial flow of the material handled, after equilibrium, from the region adjacent the inner jacket 16 to the region adjacent the walls of pipe 10. Thus, the heat transfer that takes place by reason of the material handled between the walls of pipe 10 and inner jacket 16 takes place to a major degree through conduction and radiation between quiescent, or at most slowly moving molecules of the material handled rather than by movement of the molecules of the material handled.

I claim:

1. A tubular insulating member, said member including unconnected concentrically disposed inner and outer metal jackets, said jackets being spaced from each other to provide an annular open ended chamber, said jackets having openings therein for communication with said annular chamber, and porous insulating material disposed in said chamber to provide a heat barrier between said jackets of substantially uniform heat conductivity, said porous material serving as the sole means for maintaining said jackets in their spaced relation, the insulating material at the ends of said chamber being felt-like and movable as a unit, each of said jackets being corrugated adjacent their ends, said corrugations being disposed in spaced planes transverse to the longitudinal axis of said member, said corrugations serving to maintain said felt-like insulating material in position.

2. An insulating member including generally concentric inner and outer metal jackets spaced from each other to provide an open ended annular chamber, porous insulating material disposed in said annular chamber forming a continuous heat barrier of substantially uniform conductivity, the insulating material adjacent the ends of said jackets being movable as a unit, the remainder of the insulating material being subdivided into individually movable portions, said jackets having at least one passageway therein between their ends providing communication with said chamber for pressure equalization, and means adjacent the ends of each of said jackets serving to stiffen said jackets against collapse and to maintain said insulation movable as a unit fixed in position.

3. In apparatus for handling media at elevated temperatures, a vessel, an insulation liner positioned adjacent the inner surface of the vessel walls, said liner comprising a plurality of sections and means connecting adjacent sections for limited relative movement, each of said sections including spaced inner and outer metal jackets, said jackets providing a continuous space between them extending for the full length of said liner, porous insulating material in the space between said jackets, the insulating material adjacent the ends of said jackets being movable as a unit, and means at the ends of each of said jackets engaging the insulating material thereat to prevent movement thereof, said jackets including at least one opening therein through which the heated medium can pass for equalizing the pressure within said vessel and the space between said jackets.

4. In apparatus for handling media at elevated temperatures, a vessel, an insulation liner formed of a plurality of sections disposed adjacent the inner surface of the vessel walls, each of said sections including inner and outer metal jackets spaced to provide an uninterrupted annular chamber, porous insulating material filling said annular chamber, the insulating material adjacent the ends of said jackets being felt-like and movable as a unit, said jackets having corrugations therein adjacent each of their ends extending into said chamber to engage said felt-like insulating material to restrain it against movement, said jackets having at least one opening therein through which the heated medium can pass for equalizing the pressure within said vessel and said chamber, the ends of the jackets of adjacent sections being telescoped within each other with the felt-like insulating material in abutment, and means connecting the telescoped ends of said outer jackets, said means arranged to provide limited relative movement between the connected outer jackets.

ALBERT L. BAKER.